(12) United States Patent
Dai et al.

(10) Patent No.: US 8,391,399 B2
(45) Date of Patent: Mar. 5, 2013

(54) SINGLE CARRIER WAVEFORM SYSTEM WITH FREQUENCY DOMAIN EQUALIZATION

(75) Inventors: Qingyuan Dai, Germantown, MD (US); Charles H. Woloszynski, Vienna, VA (US); Gregory N. Smith, Herndon, VA (US)

(73) Assignee: Elbit Systems of America, LLC, Fort Worth, TX (US)

( * ) Notice: Subject to any disclaimer, the term of this patent is extended or adjusted under 35 U.S.C. 154(b) by 693 days.

(21) Appl. No.: 12/610,628

(22) Filed: Nov. 2, 2009

(65) Prior Publication Data

US 2010/0290554 A1 Nov. 18, 2010

Related U.S. Application Data

(60) Provisional application No. 61/177,947, filed on May 13, 2009.

(51) Int. Cl.
*H04B 15/00* (2006.01)
(52) U.S. Cl. .......................... 375/285; 375/347; 375/316
(58) Field of Classification Search .................. 375/285, 375/347, 316
See application file for complete search history.

(56) References Cited

U.S. PATENT DOCUMENTS

| | | | |
|---|---|---|---|
| 7,187,903 B1 * | 3/2007 | Febvre et al. | 455/13.2 |
| 2001/0028678 A1 * | 10/2001 | Kato et al. | 375/222 |
| 2002/0172187 A1 | 11/2002 | Shalvi et al. | |
| 2003/0108084 A1 | 6/2003 | Bolourchi et al. | |
| 2004/0248518 A1 | 12/2004 | Kashiwase | |
| 2006/0034362 A1 * | 2/2006 | Kim et al. | 375/232 |
| 2007/0019756 A1 | 1/2007 | Hedayat | |
| 2008/0225936 A1 | 9/2008 | Hong et al. | |

FOREIGN PATENT DOCUMENTS

WO WO2009027408 A2 3/2009

OTHER PUBLICATIONS

Patent Cooperation Treaty, International Searching Authority, PCT, International Application No. PCT/US2010/034645, Mailed Aug. 30, 2010, 5 pages.

* cited by examiner

*Primary Examiner* — Shuwang Liu
*Assistant Examiner* — Michael Neff
(74) *Attorney, Agent, or Firm* — Conley Rose, P.C.

(57) ABSTRACT

A communications system includes one or more antennas and a receiver coupled to the one or more antennas. The one or more antennas are operable to receive a signal transmitted from a transmitter. The receiver includes a combiner that is operable to combine the signals received by the one or more antennas into a combined signal. The signal received by the receiver is a single-carrier waveform comprising a signal field and one or more data fields after the signal field. The signal field indicates a modulation technique of the one or more data fields. The one or more data fields include a first short unique word, a data payload after the second short unique word, and a second short unique word after the data payload.

18 Claims, 4 Drawing Sheets

SINGLE CARRIER WAVEFORM SYSTEM WITH FREQUENCY DOMAIN EQUALIZATION

CROSS-REFERENCE TO RELATED APPLICATION

This application claims the benefit of priority under 35 U.S.C. §119(e) of U.S. Provisional Application Ser. No. 61/177,947, entitled "Single Carrier Waveform with Frequency Domain Equalization", filed May 13, 2009.

TECHNICAL FIELD

This disclosure relates in general to communications systems and more particularly to a single carrier waveform system with frequency domain equalization.

BACKGROUND

Communicating in urban environments presents many challenges for typical communications devices, especially for fast moving devices. One such challenge is multipath interference. Typical solutions for multipath interference perform poorly in line-of-sight applications due to transmission power inefficiency.

SUMMARY OF THE DISCLOSURE

In accordance with one embodiment of the present disclosure, a communications system includes one or more antennas and a receiver coupled to the one or more antennas. The one or more antennas are operable to receive a signal transmitted from a transmitter. The receiver includes a combiner that is operable to combine the signals received by the one or more antennas into a combined signal. The signal received by the receiver is a single-carrier waveform comprising a signal field and one or more data fields after the signal field. The signal field indicates a modulation technique of the one or more data fields. The one or more data fields include a first short unique word, a data payload after the second short unique word, and a second short unique word after the data payload.

Numerous technical advantages are provided according to various embodiments of the present disclosure. Particular embodiments of the disclosure may exhibit none, some, or all of the following advantages depending on the implementation. In certain embodiments, an improved communications system that maximizes received signal power in line-of-sight operations while providing resistance to multipath fading effects in urban environments can be achieved. In certain embodiments, an improved communications system that is power efficient and capable of long range operation can be achieved. Various embodiments may also support rapid channel estimation and channel equalization for improved operation in urban environments. Various embodiments may also support varying spectral efficiency and range in a power-efficient waveform that can operate in multipath environments. In certain embodiments, a reduction in interference due to jamming may be achieved.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF THE DRAWINGS

Embodiments of the present disclosure and its advantages are best understood by referring to FIGS. 1 through 7 of the drawings, like numerals being used for like and corresponding parts of the various drawings.

Radio transceivers and other communications devices are frequently operated in urban environments. Such environments are often populated with buildings and other structures that hinder signals sent and received by communications devices. One particular problem presented by urban environments is multipath interference, which occurs when parts of a radio wave travel along many different reflected paths to a receiver and thus arrive at the receiver slightly out of phase with each other. Traditional approaches to dealing with multipath interference include technologies such as orthogonal frequency-division multiplexing (OFDM). Traditional approaches, however, are not power efficient and do not function well in line-of-sight applications. Additionally, traditional approaches to dealing with multipath interference do not include any anti-jamming capability.

The teachings of certain embodiments of the disclosure recognize that it would be desirable to provide a power-efficient system and method for communicating both in line-of-sight applications and in urban environments where multipath interference is prevalent. FIGS. 1 through 7 below illustrate a system and method utilizing a single carrier waveform with frequency domain equalization to provide a power-efficient and anti-jamming solution for communicating both in line-of-sight applications and in urban environments having significant multipath interference.

Figure 1:
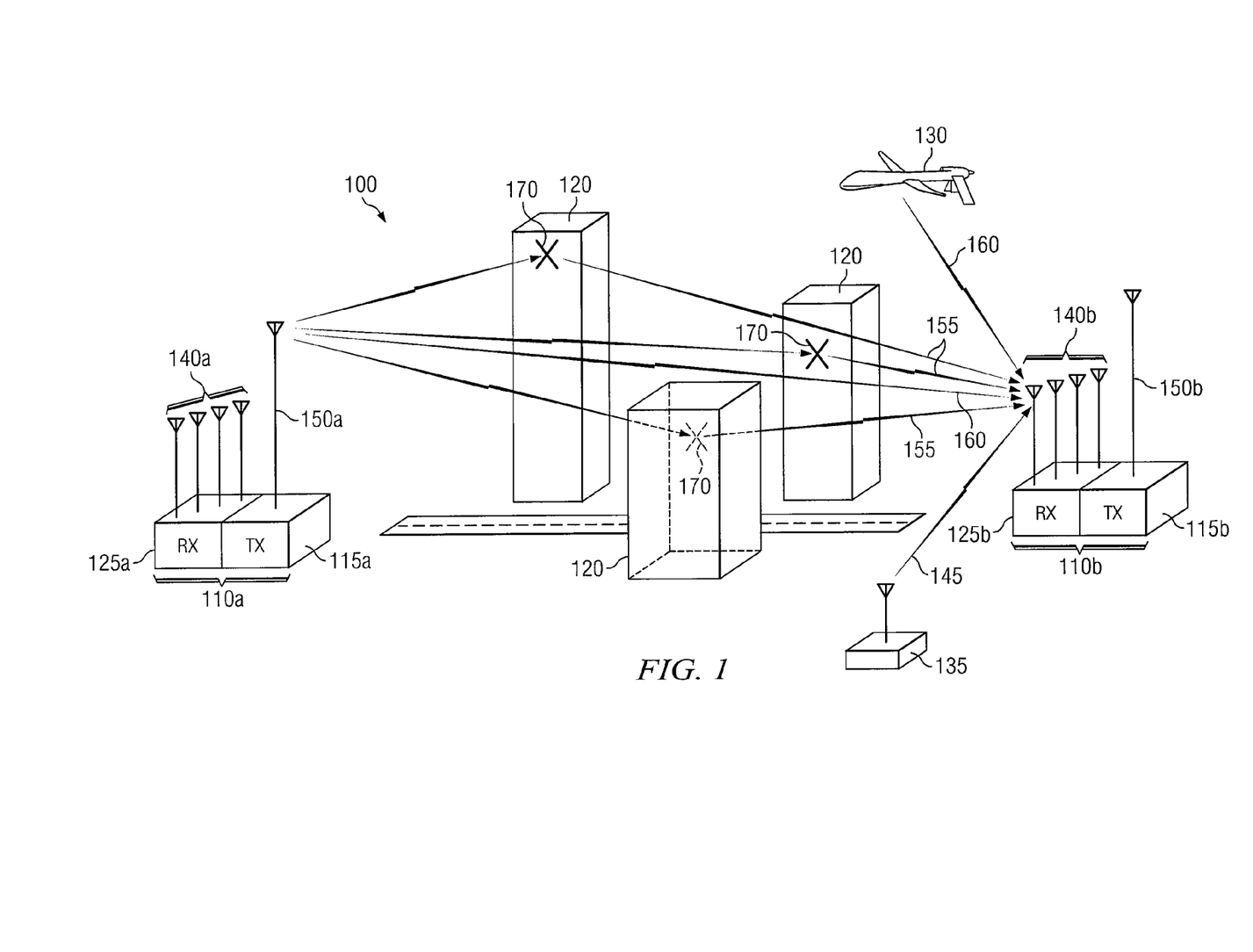
FIG. 1 is a block diagram illustrating an urban environment where particular embodiments of communications systems of this disclosure may be utilized.

FIG. 1 illustrates an example urban environment 100 where particular embodiments of a communications device 110 may be utilized. Urban environment 100 may include structures 120, aircraft 130, reflected signals 155, and line-of-sight signals 160. Urban environment 100 may be, for example, a city having tall buildings as structures 120.

In certain embodiments, communications device 110 may be a radio having a transmitter 115, a receiver 125, one or more receiving antennas 140, or a transmitting antenna 150.

In certain embodiments, communications devices 110 may be stationary. In other embodiments, communications devices 110 may be attached to moving objects including, but not limited to, ground vehicles and aircraft such as aircraft 130. Aircraft 130 may be any type of aircraft including manned aircraft and unmanned aerial vehicles (UAVs).

Urban environment 100 may also include a jamming device 135. Jamming device 135 may transmit a jamming signal 145 in an attempt to prevent communications devices 110 from receiving other legitimate signals.

In operation, communications devices 110 communicate with each other and other devices such as aircraft 130 in urban environment 100. For example, receiver 125b may receive signals transmitted from transmitter 150a and/or aircraft 130. In certain situations, receiver 125b may receive line-of-sight signals 160 from transmitter 150a and/or aircraft 130. Line-of-sight signals 160 include those signals that have traveled directly from their transmitter and have not been reflected off of another surface. Additionally or alternatively, receiver 125b may receive reflected signals 155 that have been reflected off of structures 120 at reflection points 170 before being received. Reflected signals 155 typically arrive at receiver 125b slightly out of phase with each other, thereby creating multipath interference.

To effectively and efficiently communicate in both line-of-sight applications and in environments such as urban environment 100 where multipath interference is significant, communications devices 110 utilize a single carrier waveform with frequency domain equalization as described below in reference to FIGS. 2-7.

Figure 2:
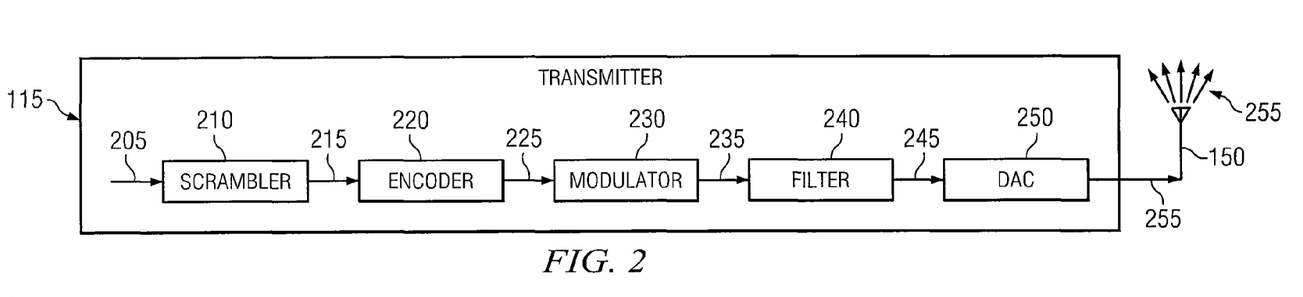
FIG. 2 is a block diagram illustrating a particular embodiment of a transmitter that may be utilized by the communications systems in FIG. 1.

FIG. 2 illustrates a particular embodiment of transmitter 115 that may be utilized by communications devices 110 in FIG. 1. In certain embodiments, transmitter 115 may include a scrambler 210, an encoder 220, a modulator 230, a filter 240, a digital-to-analog converter (DAC) 250, and transmitting antenna 150.

In certain embodiments of transmitter 115, scrambler 210 may be coupled to encoder 220. Scrambler 210 may receive unscrambled signal 205, produce scrambled signal 215 from unscrambled signal 205, and transmit scrambled signal 215 to encoder 220. Scrambler 210 may utilize any appropriate scrambling technique to produce scrambled signal 215. In certain embodiments, scrambler 210 receives and scrambles a signal according to data frame 400 described below in reference to FIGS. 4 and 5.

In certain embodiments of transmitter 115, encoder 220 may be coupled to scrambler 210 and modulator 230. Encoder 220 may receive scrambled signal 215 from scrambler 210, produce encoded signal 225 from scrambled signal 215, and transmit encoded signal 225 to modulator 230. In certain embodiments, encoder 220 may utilize Reed-Solomon encoding to produce encoded signal 225, thereby providing high signal quality and a low bit-error rate (BER) with minimal computational complexity.

In certain embodiments of transmitter 115, modulator 230 may be coupled to encoder 220 and filter 240. Modulator 230 may receive encoded signal 225 from encoder 220, produce modulated signal 235 from encoded signal 225, and transmit modulated signal 235 to filter 240. Modulator 230 may utilize any appropriate modulation technique to produce modulated signal 235 including, but not limited to, phase-shift keying (PSK). In particular embodiments, for example, modulator 230 may be capable of utilizing BPSK, QPSK, 8-PSK, and 16-PSK encoding to allow for multiple data rates.

In certain embodiments of transmitter 115, filter 240 may be coupled to modulator 230 and DAC 250. Filter 240 may receive modulated signal 235 from modulator 230, produce filtered signal 245 from modulated signal 235, and transmit filtered signal 245 to DAC 250. Filter 240 may be utilized as a shape filter to limit the spectrum of filtered signal 245. In a particular embodiment, for example, filter 240 may be a 33-tap square-root raised Cosine filter with $\alpha=0.2$ and sampling at 12.5 Msps.

In certain embodiments of transmitter 115, DAC 250 may be coupled to filter 240 and transmitting antenna 150. DAC 250 may receive filtered signal 245 from filter 240, produce analog signal 255, and transmit analog signal 255 to transmitting antenna 150. DAC 250 may utilize any appropriate technique to convert filtered signal 245 to analog signal 255. Transmitting antenna 150 receives analog signal 255 from DAC 250 and broadcasts analog signal 255 into the air. Once broadcast, analog signal 255 may become reflected signals 155 or line-of-sight signals 160 and may be received and processed by receiver 125 as discussed in more detail below.

Figure 3:
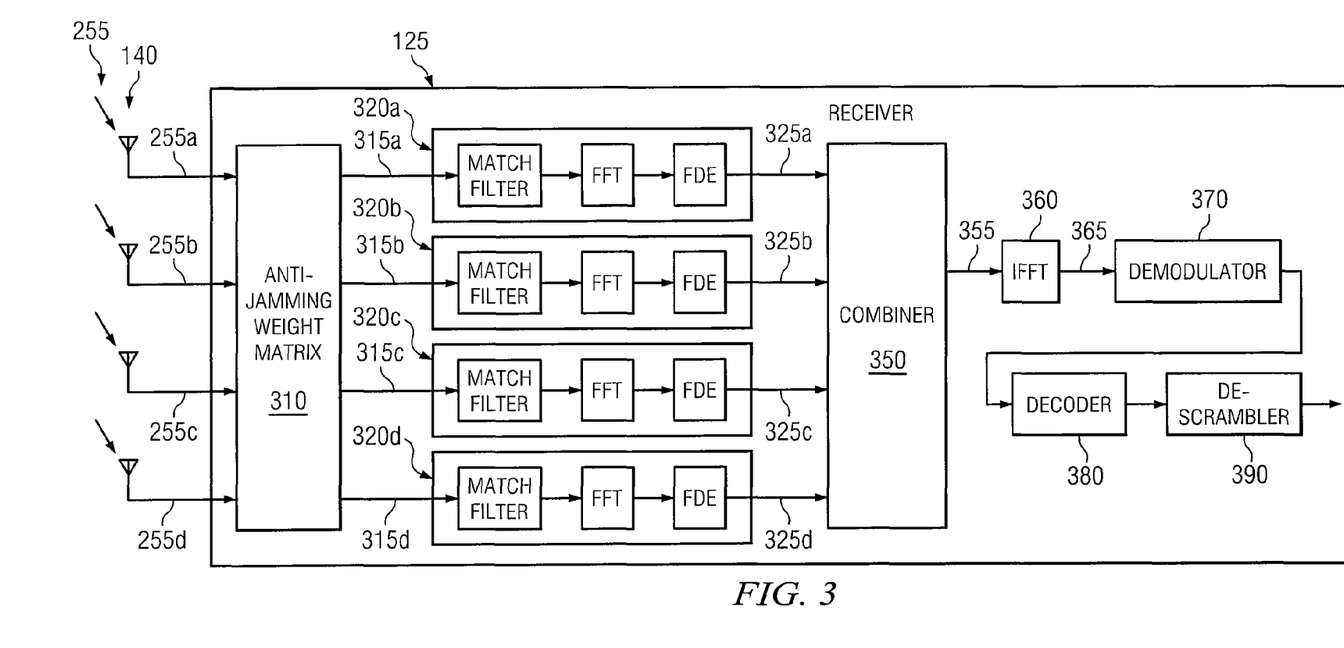
FIG. 3 is a block diagram illustrating a particular embodiment of a receiver that may be utilized by the communications systems in FIG. 1.

FIG. 3 illustrates a particular embodiment of receiver 125 that may be utilized by communications devices 110 in FIG. 1. In certain embodiments, receiver 125 may include one or more receiving antennas 140, an anti-jamming weight matrix 310, one or more FDE engines 320, a combiner 350, an inverse fast Fourier transform (IFFT) 360, a demodulator 370, a decoder 380 and a descrambler 390.

Certain embodiments of receiver 125 may include one or more receiving antennas 140 to receive analog signals 255 from the air. For example, receiver 125 may receive analog signals 255 as reflected signals 155 and/or line-of-sight signals 160 from transmitter 155 and/or aircraft 130. In particular embodiments, receiver 125 may include four receiving antennas 140. In other embodiments, however, receiver 125 may include more or less than four receiving antennas. When utilizing transmitter 115 with a single transmitting antenna 150 along with a receiver 125 having more than one receiving antenna 140, communications devices 110 may be referred to as a single-output, multiple-input (SOMI) system. This configuration, coupled with the waveform described in reference to FIGS. 4 and 5 below, helps communications devices 110 to maximize the received signal power in line-of-sight environments while providing resistance to multipath effects in urban environments such as urban environment 100.

In certain embodiments, receiving antennas 140 may be coupled to anti-jamming weight matrix 310. Anti-jamming weight matrix 310 utilizes a smart null steering antenna array to reduce interference due to jamming attempts on analog signal 255. For example, jamming device 135 in urban environment 100 may transmit jamming signal 145 towards communications device 110b. In another example, an inadvertent signal may be transmitted towards communications device 110b that effectively prevents communications device 110b from receiving an intended signal. To counter both deliberate and inadvertent jamming, anti-jamming weight matrix 310 may employ a power minimization approach that is based on the assumption that the interference is wideband over frequency and consistent over time. Such an approach seeks to maintain maximally flat gain over the field of view while simultaneously effecting nulls in the direction of the jamming. Additionally, anti-jamming weight matrix 310 may attempt to maintain output noise as independent after the null steering to allow for FDE and diversity reception.

In a particular embodiment with four receiving antennas 140, for example, anti-jamming weight matrix 310 may perform calculations according to equations 1-5 below in order to reduce interference due to jamming. Interference x(k) may be described as a 4×1 vector according to equation (1) below:

$$x(n)=[x_1(n),x_2(n),x_3(n),x_4(n)]^T \quad (1)$$

where n is the time index. Assuming that one jammer is present, it may be assumed that only three of the four signals from receiving antennas 140 are useful. Based on the received vector x(n) above, the optimum weight vectors $w_1$, $w_2$, and $w_3$, are the solution to equation (2) below:

$$\text{Minimize } w_j w_j^H R_{xx} w_j \ldots j=1,2,3 \quad (2)$$

where $w_1$, $w_2$, and $w_3$ are 4×1 complex vectors and subject to equations (3) and (4) below:

$$w_j^H w_j = \begin{cases} 1, & i=j \\ 0, & i \neq j \end{cases} \text{(unitary matrix)} \quad (3)$$

$$R_{xx} = E\{x(n) \cdot x^H(n)\} \quad (4)$$

For example, when there is one jamming source, the 3×4 unitary anti-jamming matrix is applied to four receive sample sequences as equation (5) below:

$$[y_1(n)y_2(n)y_3(n)]^T = [w_1, w_2, w_3]^H [x_1(n)x_2(n)x_3(n)x_4(n)] \quad (5)$$

In certain embodiments, receiver 125 includes one or more FDE engines 320. Each FDE engine 320 corresponds to a particular receiving antenna 140. As a result, the number of FDE engines 320 in receiver 125 corresponds to the number of receiving antennas 140. While FIG. 3 illustrates four receiving antennas 140 and four FDE engines 320, other embodiments of receiver 125 may have a different number of these components. In particular embodiments, for example, receiver 125 may have 2, 6, 8, 10, 12, 14, 16, or any other number of receiving antennas 140 and FDE engines 320.

FDE engines 320 perform frequency domain equalization in order to remove multipath interference. In certain embodiments, FDE engines 320 may be coupled to anti-jamming weight matrix 310 and combiner 350. For example, FDE engine 320a may receive anti-jammed signal 315a from anti-jamming weight matrix 310. FDE engine 320 may first employ a match filter to reject noise in anti-jammed signal 315a. FDE engine 320 may then utilize a fast Fourier transform (FFT) algorithm to compute the discrete Fourier transform of the filtered anti-jammed signal 315a. Finally, FDE engine 320 may perform frequency domain equalization and transmit equalized signal 325a to combiner 350.

In a particular embodiment of FDE engine 320, for example, equation (6) below may be utilized to calculate the minimum mean square error FDE $Z_j(k)$ on the $j^{th}$ receiving antenna:

$$Z_j(k) = G_j(k) \cdot Y_j(k) \quad (6)$$

where the input frequency domain sample $Y_j(k)$ may be calculated according to equation (7) below:

$$Y_j(k) = fft(y_j(n)), j=1,2,3 \quad (7)$$

and the FDE coefficients $W_j(k)$ may be calculated according to equation (8) below:

$$G_j(k) = \frac{\hat{H}_j^*(k)}{\sigma_n^2(j) + |\hat{H}_j^*(k)|} \quad (8)$$

In certain embodiments, receiver 125 includes combiner 350. Combiner 350 aids with receiver diversity by receiving equalized signals 325 from FDE engines 320 and coherently combining equalized signals 325 to produce a combined signal 355. In particular embodiments, for example, combiner 350 performs simple averaging of equalized signals 325 to produce combined signal 355. Additionally, combiner 350 may adjust the average of equalized signals 325 according to automatic gain control calculations of receiver 125. In a particular embodiment, for example, combiner 350 averages the minimum mean square error FDE $Z_j(k)$ from FDE engines 320 according to equation (9) below to produce combined signal 355:

$$Z(k) = \sqrt{RSSI(j)} \cdot Z_j(k) \quad (9)$$

where RSSI(j) is the $j^{th}$ antenna receive signal strength indicator calculated by receiver 125.

Once combiner 350 combines equalized signals 325 to produce combined signal 355, combined signal 355 may be converted to a time domain signal 365 by IFFT 360. Time domain signal 365 may then be demodulated by demodulator 370, decoded by decoder 380, and descrambled by descrambler 390. Demodulator 370, decoder 380, and descrambler 390 perform the inverse of their respective blocks (modulator 230, encoder 220, and scrambler 210) in transmitter 115 described above.

Figure 4:
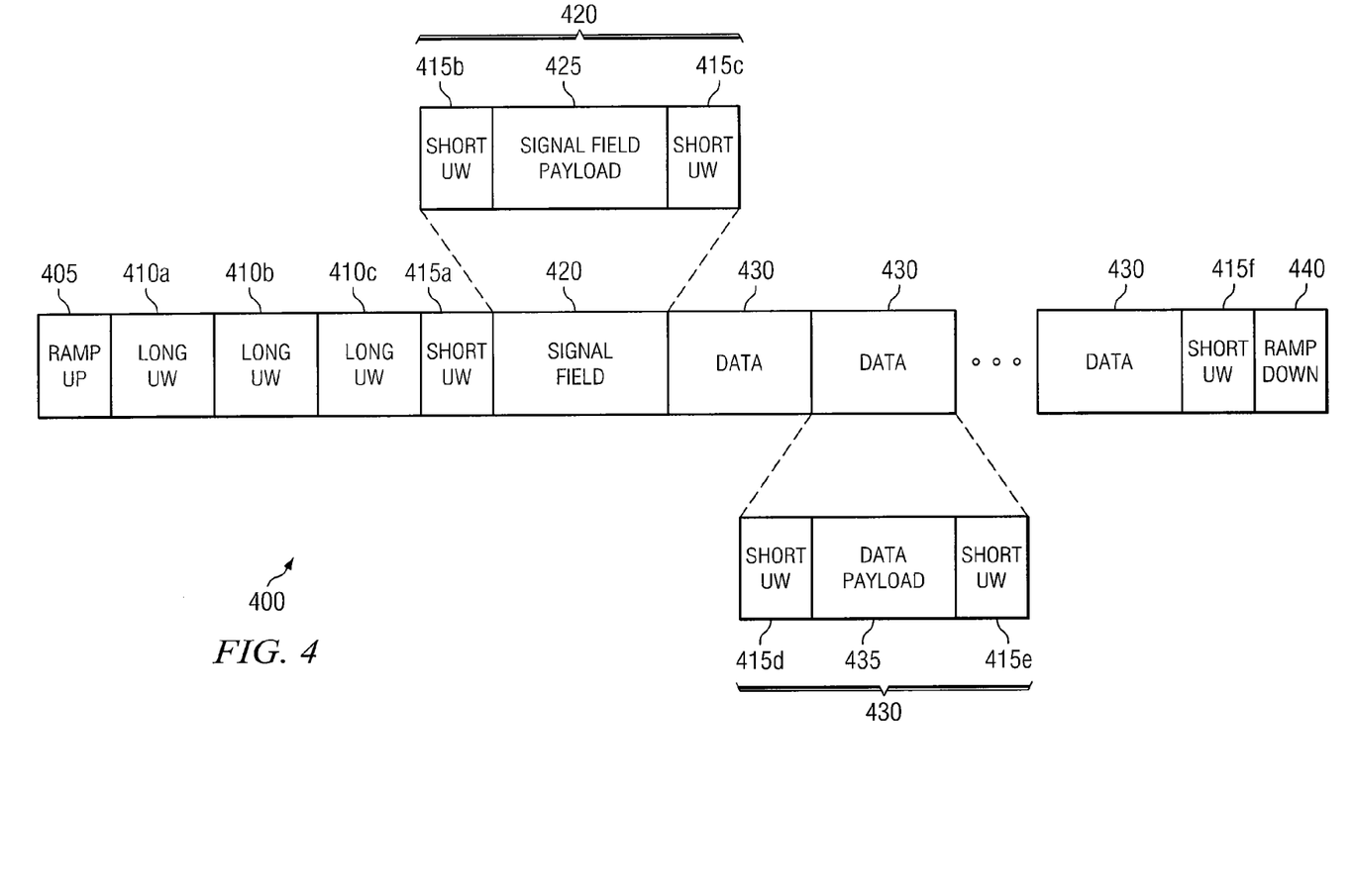
FIG. 4 is a block diagram illustrating a particular embodiment of a data frame that may be utilized by the communications systems in FIG. 1.

FIG. 4 illustrates a particular embodiment of a data frame 400 that may be utilized by communications devices 110 and aircraft 130 in FIG. 1. Data frame 400 is a single-carrier waveform with frequency domain equalization (SC-FDE). In certain embodiments, data frame 400 includes a ramp-up field 405, long unique words 410, short unique words 415, a signal field 420, one or more data fields 430, and a ramp-down field 440. Data frame 400 may utilize Reed-Solomon encoding for forward error correction (FEC), or any other appropriate encoding technique.

In certain embodiments, data frame 400 begins with ramp-up field 405 and ends with ramp-down field 440. Ramp-up field 405 and ramp-down field 440 may be designed to correspond to the transit time of filter 240 in transmitter 115. In particular embodiments, for example, both ramp-up field 405 and ramp-down field 440 consist of four symbols.

In certain embodiments, data frame 400 includes long unique words 410a, 410b, and 410c after ramp-up field 405. Long unique words 410 may be utilized by receiver 125 to set the automatic gain control and automatic frequency control, for carrier frequency offset estimation, for noise power estimation, and to achieve frame timing synchronization. In particular embodiments, for example, long unique words 410 may be 64 symbol long Frank sequences.

In certain embodiments, data frame 400 includes short unique word 415a after long UW 410c, and short unique word 415f before ramp-down field 440. Short unique words 410 of frame structure 400 may be, for example, sixteen symbol Frank sequences.

After short unique word 415a, certain embodiments of frame structure 400 may include a signal field 420. Signal field 420 includes short unique word 415b, followed by a signal field payload 425, followed by another short unique word 415c. In certain embodiments, signal field payload 425 is 112 symbols in length and includes seven bytes of data. Signal field 420 may be modulated and encoded with any appropriate technique. In a particular embodiment, for example, signal field 420 is BPSK modulated with Reed-Solomon encoding.

In certain embodiments, data frame 400 includes one or more data fields 430 after signal field 420. Data fields 430 include short unique word 415d, followed by a data payload 435, followed by short unique word 415e. In certain embodiments, data payload 435 is 112 symbols in length and includes seven bytes of data. Data payloads 435 may be modulated using any modulation scheme such as BPSK, QPSK, 8-PSK, or 16-PSK. As described in more detail below, the particular modulation scheme of data payloads 435 is indicated in the signal field payload 425 that precedes data payloads 435.

Signal field payload 425 may be utilized to transfer information such as rate and length of frame structure 400. For example, signal field payload 425 may indicate that data frame 400 includes a particular number of data fields 430 and that each data field 430 of that particular data frame 400 has been modulated using a particular modulation such as BPSK, QPSK, 8-PSK, or 16-PSK. As a result, each data frame 400 may have a different modulation and/or coding rate for data fields 430, thereby providing the capability to easily switch between data rates depending on factors such as the particular application and/or environmental conditions.

As an example, communications device 110a of FIG. 1 may wish to send critical mission command and control data and then less critical video data to communications device 110b. To ensure that communications device 110b receives the critical mission command and control data without error, transmitter 115a may transmit the command and control data using data frame 400 that has been modulated using a low rate such as BPSK. To do this, each data frame 400 that is used to send the command and control data indicates via signal field payload 425 that each data field 430 has been modulated using BPSK. However, once the mission critical data has been transmitted using BPSK, transmitter 115a may wish to switch to a higher rate such as 16-PSK in order to send the video data to communications device 110b. To do this, each data frame 400 that is used to send the video data indicates via signal field payload 425 that each data field 430 has been modulated using 16-BPSK. As a result, communications device 110a is able to easily switch between transmission rates depending on the type of data it wishes to transmit.

Certain embodiments of data frame 400 may provide a channel bandwidth of approximately 3.85 MHz. Other embodiments of data frame 400 may provide a channel bandwidth of approximately 3.25 MHz. Data frame 400, however, is not limited to a specific channel bandwidth and may be scaled to other bandwidths.

Existing approaches to dealing with multipath interference do not address high mobility rapid channel estimation (CHEST). For example, typical approaches place a sequence of short unique words (also known as channel estimation bursts) at the beginning of a data payload and assume that it is stationary across the period of the data payload. As described in more detail below in reference to FIG. 5, however, data frame 400 includes data payloads 435 that are surrounded by short unique words 415d and 415e. As a result, data frame 400 provides improved channel estimation for improved mobility.

Figure 5:
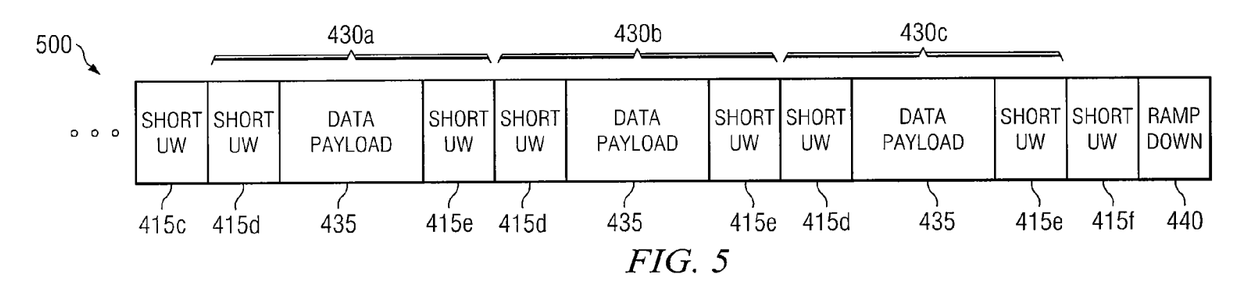
FIG. 5 is a block diagram illustrating another embodiment of a data frame that may be utilized by the communications systems in FIG. 1.

FIG. 5 illustrates a particular embodiment 500 of data frame 400. Embodiment 500 of data frame 400 includes three data fields 430: data field 430a, data field 430b, and data field 430c. As illustrated in FIG. 5, each data payload 435 is surrounded by two short unique words 415. Because each short unique word 415 has zero DC content, each group of two unique words 415 functions as guard intervals for data payload 435 by ensuring that each channel estimate is not influenced by information from outside the interval. In addition, once data frame 400 has been received, receiver 125 may compute the average channel that occurred during the data payload by averaging the channel estimate from before the data payload and after. This information may be used to estimate and correct any Doppler shift of the signal. As a result, data frame 400 provides improved channel estimation and tracking in high Doppler situations.

Figure 6:
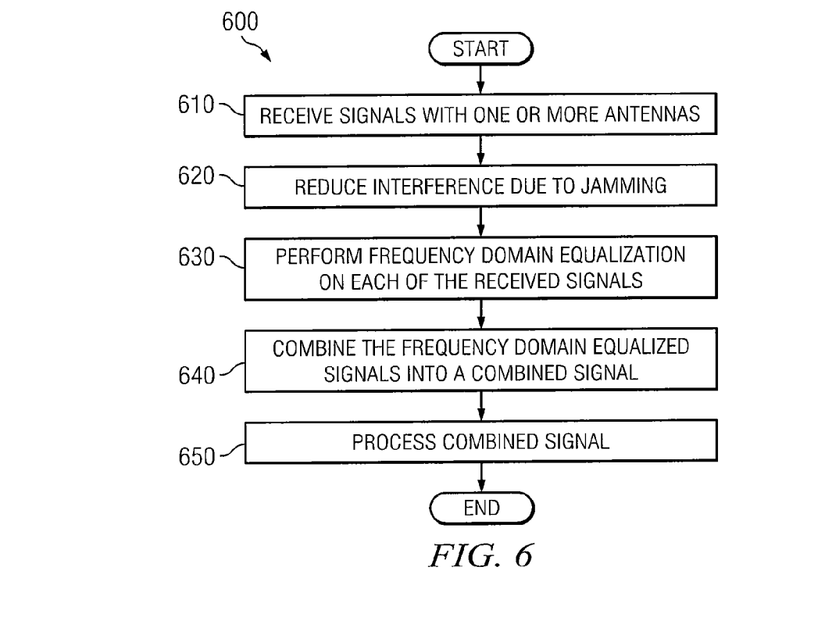
FIG. 6 is a flow chart illustrating a particular embodiment of method that may be utilized by the communications systems in FIG. 1.

FIG. 6 illustrates a method 600 of communicating using a single carrier waveform with frequency domain equalization.

Method 600 begins in step 610 where one or more signals are received with one or more antennas. For example, the one or more received signals may be analog signal 255 and the one or more antennas may be receiving antennas 140 described above. Analog signal 255 may be the analog version of a signal formed from data frame 400 previously described.

In certain embodiments, method 600 includes step 620 where interference due to jamming is reduced. For example, step 620 may utilize an anti-jamming weight matrix such as anti-jamming weight matrix 310 described above. Step 620 may include reducing interference from both deliberate and inadvertent jamming.

In certain embodiments, method 600 includes step 630 where frequency domain equalization is performed on either the signals received in step 610 or the resulting signals from step 620. In particular embodiments, step 620 utilizes one or more FDE engines 320 previously described to perform frequency domain equalization on each of the received signals in order to produce an output. In certain embodiments, step 620 may also include computing a first channel estimation using a first unique word of each data field in the received signal, computing a second channel estimation using a second unique word of each data field, and averaging the first and second channel estimations.

In certain embodiments, method 600 includes step 640 where the outputs from step 630 are combined into a combined signal. In particular embodiments, step 640 utilizes combiner 350 previously described to average the outputs from the one or more frequency domain equalization engines to produce the combined signal.

In certain embodiments, method 600 includes step 650 where the combined signal produced in step 650 is processed. In particular embodiments, for example, step 650 includes demodulating, decoding, and descrambling the combined signal.

Figure 7:
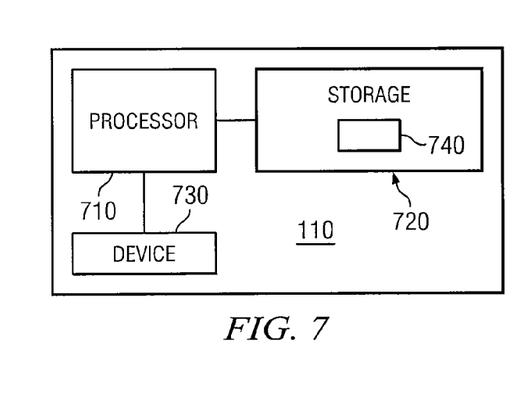
FIG. 7 is a block diagram illustrating a particular embodiment of the communications systems in FIG. 1.

FIG. 7 illustrates a communications system 110 according to one embodiment of the disclosure. In certain embodiments, communications system 110 may include some or all of the following: a processor 710, a storage device 720, and a device 730.

Processor 710 generally refers to any suitable processing device capable of executing instructions and manipulating data to perform operations for system 100. For example, processor 710 may include any type of multi-core central processing unit (CPU).

Storage device 720 may refer to any suitable device capable of storing and facilitating retrieval of data. Examples of storage device 720 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium. In this example, an application 740 is embodied as logic within storage device 720 and generally provides communication processes as described above.

Device 730 may refer to any suitable device capable of performing communication processes as described above. Examples of device 730 include field-programmable gate arrays (FPGAs), application specific integrated circuits (ASICs), digital signal processors (DSPs), and the like. In certain embodiments, device 730 may be coupled to processor 710. In certain embodiments, more than one device 730 may be utilized by communications system 110.

The components of communications system 110 may be integrated or separated. In some embodiments, components 710-740 may each be housed within a single chassis. The operations of communications system 110 may be performed by more, fewer, or other components. Additionally, operations of communications system 110 may be performed using any suitable logic that may comprise software, hardware, other logic, or any suitable combination of the preceding.

Although the embodiments in the disclosure have been described in detail, numerous changes, substitutions, variations, alterations, and modifications may be ascertained by those skilled in the art. It is intended that the present disclosure encompass all such changes, substitutions, variations, alterations, and modifications as falling within the spirit and scope of the appended claims.

What is claimed is:

1. A communications system, comprising:
   one or more antennas operable to receive a signal transmitted from a transmitter; and
   a receiver coupled to the one or more antennas, the receiver comprising a combiner operable to combine the signals received by the one or more antennas into a combined signal;
   wherein the signal received by the receiver is a single-carrier waveform comprising a signal field and one or more data fields after the signal field, the signal field indicating a modulation technique of the one or more data fields, the one or more data fields comprising:
   a first short unique word;
   a data payload after the first short unique word; and
   a second short unique word after the data payload,
   wherein the receiver is operable to perform rapid channel estimation by:
   computing a first channel estimation using the first short unique word of the data field;
   computing a second channel estimation using the second short unique word of the data field; and
   averaging the first and second channel estimations.

2. The communications system of claim 1, the single-carrier waveform further comprising:
   a third short unique word before the signal field;
   three long unique words before the third short unique word; and
   a fourth short unique word after the one or more data fields.

3. The communications system of claim 1, the receiver further comprising an anti-jamming weight matrix, the anti-jamming weight matrix comprising a null steering array operable to reduce interference due to jamming of the received signal.

4. The communications system of claim 1, wherein the communications system comprises four antennas.

5. The communications system of claim 1, wherein the receiver further comprises one or more frequency domain equalization engines, the number of frequency domain equalization engines equal to the number of antennas, each frequency domain equalization engine corresponding to a respective one of the antennas and operable to perform frequency domain equalization on the signal received by the corresponding antenna to produce an output.

6. The communications system of claim 5, wherein the combiner is operable to average the outputs from the one or more frequency domain equalization engines in order to combine the signals received by the one or more antennas into a combined signal.

7. A communications system operable to communicate using a single-carrier waveform with frequency domain equalization, the single-carrier waveform comprising a signal field and one or more data fields after the signal field, the signal field indicating a modulation technique of the one or more data fields, the one or more data fields comprising:
   a first short unique word; a data payload after the first short unique word; and
   a second short unique word after the data payload and further operable to perform rapid channel estimation by:
   computing a first channel estimation using the first short unique word of the data field;
   computing a second channel estimation using the second short unique word of the data field; and
   averaging the first and second channel estimations.

8. The communications system of claim 7, the single-carrier waveform further comprising:
   a third short unique word before the signal field;
   three long unique words before the third short unique word; and
   a fourth short unique word after the one or more data fields.

9. The communications system of claim 7, further comprising:
   a transmitter;
   a receiver; and
   one or more antennas coupled to the receiver.

10. The communications system of claim 7, further comprising an anti-jamming weight matrix, the anti-jamming weight matrix comprising a null steering array operable to reduce interference due to jamming of the single-carrier waveform.

11. The communications system of claim 9, wherein the communications system comprises four antennas.

12. The communications system of claim 7, the communications system comprising one or more frequency domain equalization engines and one or more antennas, the number of frequency domain equalization engines equal to the number of antennas, each frequency domain equalization engine corresponding to a respective one of the antennas and operable to perform frequency domain equalization on a signal received by the corresponding antenna to produce an output.

13. The communications system of claim 12, the communications system further comprising a combiner operable to combine the signals received by the one or more antennas into a combined signal by averaging the outputs from the one or more frequency domain equalization engines.

14. A method of communicating, comprising:
   receiving one or more signals from a transmitter using one or more antennas;
   performing, by one or more frequency domain equalization engines, frequency domain equalization on the one or more signals to produce an output; combining with a combiner the outputs of the one or more frequency domain equalization engines into a combined signal;
   wherein each signal received by the receiver is a single-carrier waveform comprising a signal field and one or more data fields after the signal field, the signal field indicating a modulation technique of the one or more data fields, the one or more data fields comprising:
   a first short unique word;
   a data payload after the first short unique word; and
   a second short unique word after the data payload and further comprising performing rapid channel estimation by:
   computing a first channel estimation using the first short unique word of the data field;
   computing a second channel estimation using the second short unique word of the data field; and
   averaging the first and second channel estimations.

15. The method of claim 14, the single-carrier waveform further comprising:
   a third short unique word before the signal field;

three long unique words before the third short unique word; and a fourth short unique word after the one or more data fields.

16. The method of claim 14, further comprising reducing interference due to jamming of the received signal using an anti-jamming weight matrix, the anti-jamming weight matrix comprising a null steering array.

17. The method of claim 14, wherein the one or more antennas comprises four antennas.

18. The method of claim 14, wherein the combining comprises averaging the outputs from the one or more frequency domain equalization engines.

* * * * *